(12) United States Patent
Jin et al.

(10) Patent No.: US 11,566,510 B2
(45) Date of Patent: Jan. 31, 2023

(54) ULTRASONIC ECHO LOCATING IN A WELLBORE USING TIME GAIN COMPENSATION

(71) Applicant: Halliburton Energy Services, Inc., Houston, TX (US)

(72) Inventors: Jing Jin, Singapore (SG); Yao Ge, Singapore (SG); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 676 days.

(21) Appl. No.: 16/470,357

(22) PCT Filed: Jul. 20, 2018

(86) PCT No.: PCT/US2018/043129
§ 371 (c)(1),
(2) Date: Jun. 17, 2019

(87) PCT Pub. No.: WO2020/018117
PCT Pub. Date: Jan. 23, 2020

(65) Prior Publication Data
US 2021/0404320 A1 Dec. 30, 2021

(51) Int. Cl.
*E21B 47/095* (2012.01)
*E21B 47/002* (2012.01)
(Continued)

(52) U.S. Cl.
CPC ........ *E21B 47/0025* (2020.05); *E21B 47/085* (2020.05); *E21B 47/095* (2020.05);
(Continued)

(58) Field of Classification Search
CPC .. E21B 47/0025; E21B 47/085; E21B 47/095; E21B 47/14; G01S 15/8915; G01V 1/48; G01V 1/52; G01V 2210/1429
See application file for complete search history.

(56) References Cited

U.S. PATENT DOCUMENTS

| 4,852,576 A | * | 8/1989 | Inbar | G01S 7/52033 73/900 |
| 2008/0242997 A1 | * | 10/2008 | Lynch | G01N 29/12 600/455 |
| 2010/0290312 A1 | * | 11/2010 | Domnanish | G01V 1/48 367/27 |

FOREIGN PATENT DOCUMENTS

| KR | 20150104890 | | 9/2015 | | |
| KR | 20150104890 A | * | 9/2015 | ........... | A61B 8/5207 |

(Continued)

OTHER PUBLICATIONS

International Application No. PCT/US2018/043129, "International Search Report and Written Opinion", Apr. 3, 2019, 12 pages.

*Primary Examiner* — Isam A Alsomiri
*Assistant Examiner* — Abdallah Abulaban
(74) *Attorney, Agent, or Firm* — Kilpatrick Townsend & Stockton LLP

(57) ABSTRACT

A sensor system may be used to measure characteristics of an object in a wellbore. The sensor system may include an ultrasonic transducer that generates an ultrasonic wave in a medium of the wellbore and detects a reflection signal of the ultrasonic wave off the object in the wellbore. The sensor system may also include a processing device and a memory device in which instructions are stored. The memory may include instructions that cause the processing device to receive the reflection signal from the ultrasonic transducer, and to truncate and preprocess the reflection signal to generate a truncated reflection signal. The instructions may (Continued)

also cause the processing device to apply time gain compensation to the truncated reflection signal and determine an echo wavelet from the time gain compensated signal representing an echo of the ultrasonic wave off of a wall of the wellbore.

20 Claims, 8 Drawing Sheets

(51) Int. Cl.
| | |
|---|---|
| *E21B 47/085* | (2012.01) |
| *E21B 47/14* | (2006.01) |
| *G01S 15/89* | (2006.01) |
| *G01V 1/48* | (2006.01) |
| *G01V 1/52* | (2006.01) |

(52) U.S. Cl.
CPC .......... *E21B 47/14* (2013.01); *G01S 15/8915* (2013.01); *G01V 1/48* (2013.01); *G01V 1/52* (2013.01); *G01V 2210/1429* (2013.01)

(56) References Cited

FOREIGN PATENT DOCUMENTS

| KR | 20150104890 A | * | 9/2015 |
|---|---|---|---|
| KR | 20180033793 | | 4/2018 |
| WO | 03083466 | | 10/2003 |

* cited by examiner

ULTRASONIC ECHO LOCATING IN A WELLBORE USING TIME GAIN COMPENSATION

TECHNICAL FIELD

The present disclosure relates to devices usable in a wellbore for measuring a characteristic of the wellbore. More specifically, this disclosure relates to ultrasonic echo locating using time gain compensation in an ultrasonic imaging or caliper operation of a wellbore.

BACKGROUND

In oilfield services operations, transducers can be used for imaging or ultrasonic caliper operations in muds or other substances, among other uses. Drilling fluid (also known as "mud" or "drilling mud") or other substances can cause high attenuation in the ultrasonic signals from the transducers. Additionally, ultrasonic self-noises of a transducer can also inhibit the performance of the transducer. Low signal-to-noise ratios resulting from the high attenuation in the ultrasonic signals caused by the mud or other substances and the ultrasonic self-noise caused by the transducer itself make the use of transducers challenging to locate a correct echo of the ultrasonic signal, particularly in downhole environments of wellbores.

DETAILED DESCRIPTION

Certain aspects and examples of the disclosure relate to an ultrasonic transducer that is used in ultrasonic imaging or ultrasonic caliper applications in a wellbore to truncate a reflection signal and apply time gain compensation to the truncated signal. By truncating a reflection signal and then applying a time gain compensation, signal-to-noise ratios (SNRs) of the ultrasonic transducer can be increased to enhance applications of the ultrasonic transducer such as for use in high-quality imaging and caliper operations downhole.

An ultrasonic transducer, according to some examples, may be used in borehole imaging to enable high SNR imaging and caliper applications in logging-while-drilling (LWD) and wireline tools. In some examples, the ultrasonic transducer can transmit and receive ultrasonic signals and reflected signals. In other examples, the ultrasonic transducer can transmit ultrasonic signals and a separate sensor is used to receive the reflected signals. The transmitted and received signals may travel through a fluid medium within a wellbore.

A processing device of the ultrasonic transducer may receive the reflected signals. Because of high attenuation in the reflected signals resulting from the medium within the wellbore (e.g., drilling mud) and a ringdown noise (i.e., an ultrasonic self-noise) associated with ultrasonic signal generation by the ultrasonic transducer, the reflected signals may be processed by the processing device to improve the SNR of the reflected signal. In an embodiment, the processing device may execute instructions that cause the processor to truncate the reflected signal to a time period of interest and preprocess the reflected signal to remove of the ringdown noise. The instructions may also cause the processor to apply time gain compensation to the truncated reflection signal to generate a time gain compensated signal. Further, the instructions may cause the processor to determine an echo wavelet from the time gain compensated signal that is representative of an echo of the ultrasonic wave off of a wall of the wellbore because the time gain compensated signal may provide clear distinctions between the echo wavelet and other wavelets originating from signal noise.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
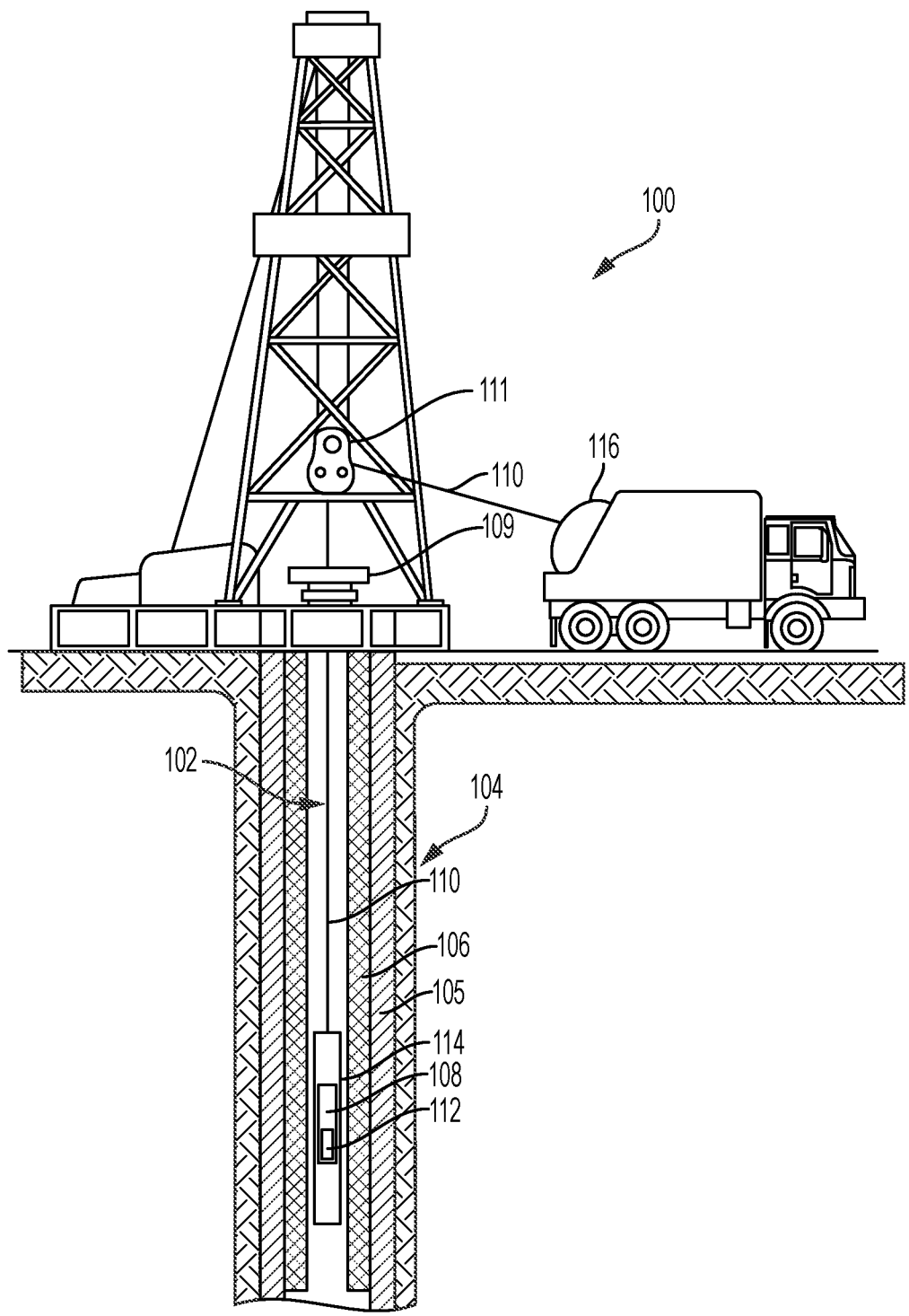
FIG. 1 is a cross-sectional view of an example of a well system that includes a downhole ultrasonic transducer according to some aspects of the present disclosure.

FIG. 1 is a cross-sectional view of an example of a well system 100 that includes a downhole ultrasonic transducer according to some aspects. The well system 100 includes a wellbore 102 extending through various earth strata. The wellbore 102 extends through a hydrocarbon bearing subterranean formation 104. A casing string 106 extends from a surface 109 through the subterranean formation 104 surrounding the wellbore 102. The casing string 106 can provide a conduit through which formation fluids, such as production fluids produced from the subterranean formation 104, can travel from the wellbore 102 to the surface 109. The casing string 106 can be coupled to the walls of the wellbore 102 via cement. For example, a cement sheath 105 can be positioned or formed between the casing string 106 and the walls of the wellbore 102 for coupling the casing string 106 to the wellbore 102.

The well system 100 can also include at least one well tool 114 (e.g., a formation-testing tool). The well tool 114 can be coupled to a wireline 110, slickline, or coiled tubing that can be deployed into the wellbore 102. The wireline 110, slickline, or coiled tubing can be guided into the wellbore 102 using, for example, a guide 111 or winch. In some examples, the wireline 110, slickline, or coiled tubing can be wound around a reel 116.

The well tool 114 can include an ultrasonic sensing system 108. The ultrasonic sensing system 108 can include an ultrasonic transducer 112 for transmitting ultrasonic waves. The ultrasonic transducer 112 can generate ultrasonic waves that are directed radially outward from the well tool 114 to interact with wells of the wellbore 102 or the casing string 106.

In some examples, the ultrasonic sensing system 108 can transmit an electrical signal to the ultrasonic transducer 112 to generate ultrasonic waves. In one or more examples, the ultrasonic waves can include a frequency that is 20 kHz and above. In such an example, the ultrasonic transducer 112 is an ultrasound ultrasonic transducer. The electrical signal can cause the ultrasonic transducer 112 to vibrate. The vibration of the ultrasonic transducer 112 can mechanically generate ultrasonic waves (e.g., pressure waves) in a medium in which the ultrasonic transducer 112 is positioned. The medium can include a gas or a liquid, such as oil, water, or mud. The ultrasonic waves can propagate through the medium and reflect off one or more features of the wellbore 102. For example, the ultrasonic waves can reflect off the subterranean formation 104, the casing string 106, the cement sheath 105, or any combination of these.

In some examples, the ultrasonic sensing system 108 can detect the reflected ultrasonic waves (e.g., by using the same transducer, or using another sensor, such as a microphone or a hydrophone) and analyze one or more characteristics of the reflected ultrasonic waves. The ultrasonic sensing system 108 can determine one or more characteristics of the wellbore 102 based on the characteristics of the reflected ultrasonic waves. For example, the ultrasonic sensing system 108 can compare a time in which the ultrasonic sensing system 108 transmitted an ultrasonic wave to another time in which the ultrasonic sensing system 108 detected a reflection of the ultrasonic wave to determine a difference between the times. In some examples, the ultrasonic sensing system 108 can determine a location, type, sound velocity, or material of an object in the wellbore 102 based on the difference. For example, the ultrasonic sensing system 108 can determine that the object is a portion of a wall of the wellbore 102, that the object is located a particular distance from the ultrasonic sensing system 108 or the well tool 114, that the object includes a particular material, or any combination of these. The analyzed signals can also be used for imaging or caliper applications. For example, the characteristic of an object can include a measured diameter of part of the wellbore 102 determined by a caliper application, an impedance of borehole material, or an existence of a deformity of a wall of the wellbore 102, such as fractures In some examples, the ultrasonic sensing system 108 can include multiple ultrasonic receivers for detecting the reflected ultrasonic waves. For example, the ultrasonic sensing system 108 can include an array of ultrasonic transducers 112 that are operable to detect the reflected ultrasonic waves. In some examples, the ultrasonic sensing system 108 can use at least two ultrasonic receivers to detect reflected ultrasonic waves. The ultrasonic sensing system 108 can determine one or more characteristics of the object in the wellbore 102 based on one or more characteristics of the reflected ultrasonic waves.

For example, the ultrasonic sensing system 108 can emit an ultrasonic wave that can propagate through the wellbore 102 and reflect off an object in the wellbore 102. Two or more of the ultrasonic receivers can detect the reflection of the ultrasonic wave. In some examples, the two or more ultrasonic receivers can be positioned to detect the reflection of the ultrasonic wave at different times. The ultrasonic sensing system 108 can determine a characteristic of the object by analyzing the different times at which the ultrasonic receivers detect the reflection. For example, the ultrasonic sensing system 108 can determine a pattern associated with the different times. The pattern can be indicative of the object including a particular characteristic. The ultrasonic sensing system 108 can determine that the object includes the characteristic based on the presence of the pattern.

The ultrasonic sensing system 108 can additionally or alternatively determine other characteristics of an object in the wellbore 102 (e.g., using any of the methods described above). For example, the ultrasonic sensing system 108 can determine a sound velocity that is characteristic of the object, a porosity of the object, a fracture characteristic of the object (e.g., whether the object includes a fracture), a material composition of the object, a texture of the object, or any combination of these. The ultrasonic sensing system 108 can determine any of these characteristics based on one or more parameters of one or more reflected or refracted ultrasonic waves detected by one or more ultrasonic receivers.

Figure 2:
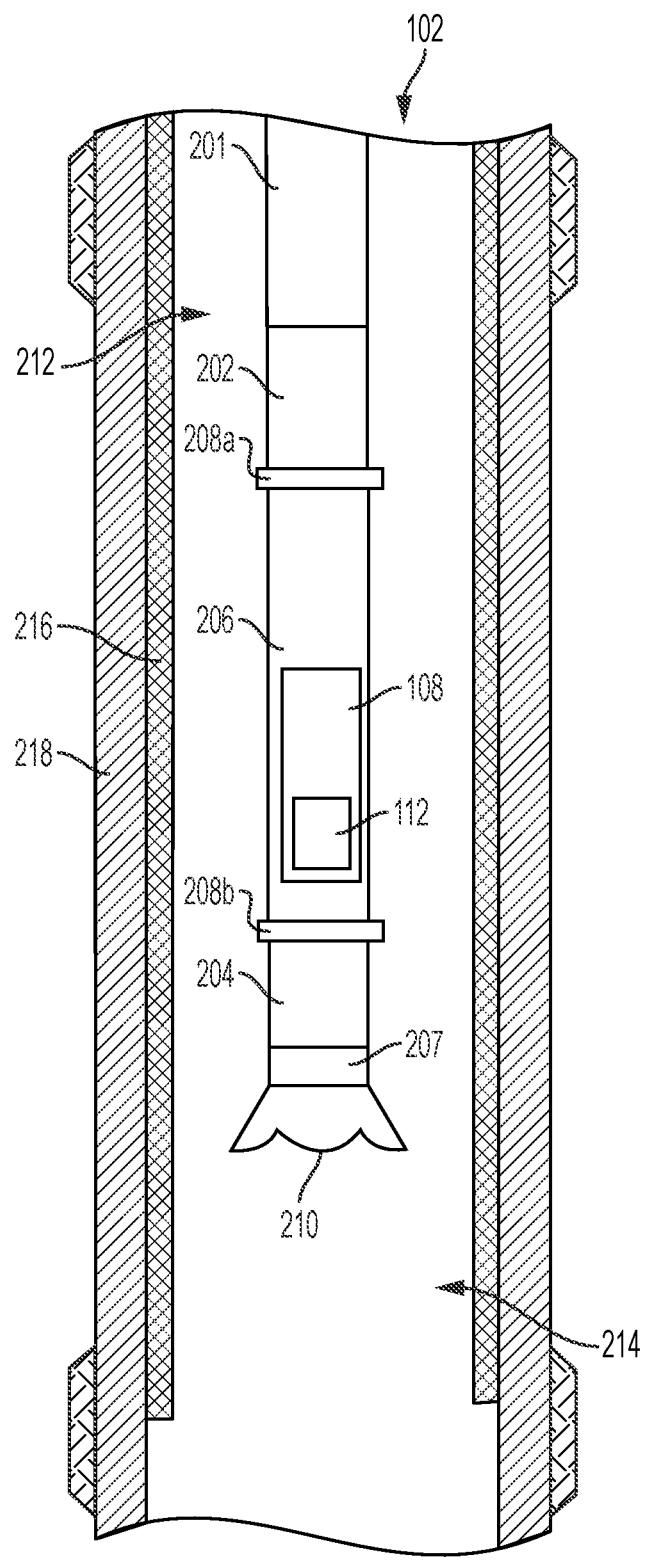
FIG. 2 is a cross-sectional view of an example of part of a well system that includes a downhole ultrasonic transducer according to some aspects of the present disclosure.

FIG. 2 is a cross-sectional view of an example of part of a well system that includes a downhole ultrasonic transducer according to some aspects. The well system includes a wellbore 102 that has a casing string 216 and a cement sheath 218. In some examples, the wellbore 102 can include fluid 214. The fluid 214 (e.g., mud) can flow in an annulus 212 positioned between the well tool 201 and a wall of the casing string 216.

The well tool 201 (e.g., a logging-while-drilling tool) can be positioned in the wellbore 102. The well tool 201 can include various subsystems 202, 204, 206, 207. For example, the well tool 201 can include a subsystem 202 that includes a communication subsystem. The well tool 201 can also include a subsystem 204 that includes a saver subsystem or a rotary steerable system. A tubular section or an intermediate subsystem 206 (e.g., a mud motor or measuring-while-drilling module) can be positioned between the other subsystems 202, 204. In some examples, the well tool 201 can include a drill bit 210 for drilling the wellbore 102. The drill bit 210 can be coupled to another tubular section or intermediate subsystem 207 (e.g., a measuring-while-drilling module or a rotary steerable system). In some examples, the well tool 201 can also include tubular joints 208a, 208b.

The well tool 201 can include an ultrasonic sensing system 108. The ultrasonic sensing system 108 can be positioned anywhere in the well tool 201 for sensing characteristics of the wellbore 102. The ultrasonic sensing system 108 can use an ultrasonic transducer 112 to transmit ultrasonic waves. The ultrasonic waves can propagate through a medium, such as fluid 214 and reflect off one or more surfaces of the wellbore 102. The ultrasonic sensing system 108 can detect the reflected ultrasonic waves. The ultrasonic sensing system 108 can determine one or more characteristics of the wellbore 102 based on the reflected ultrasonic waves.

Figure 3:
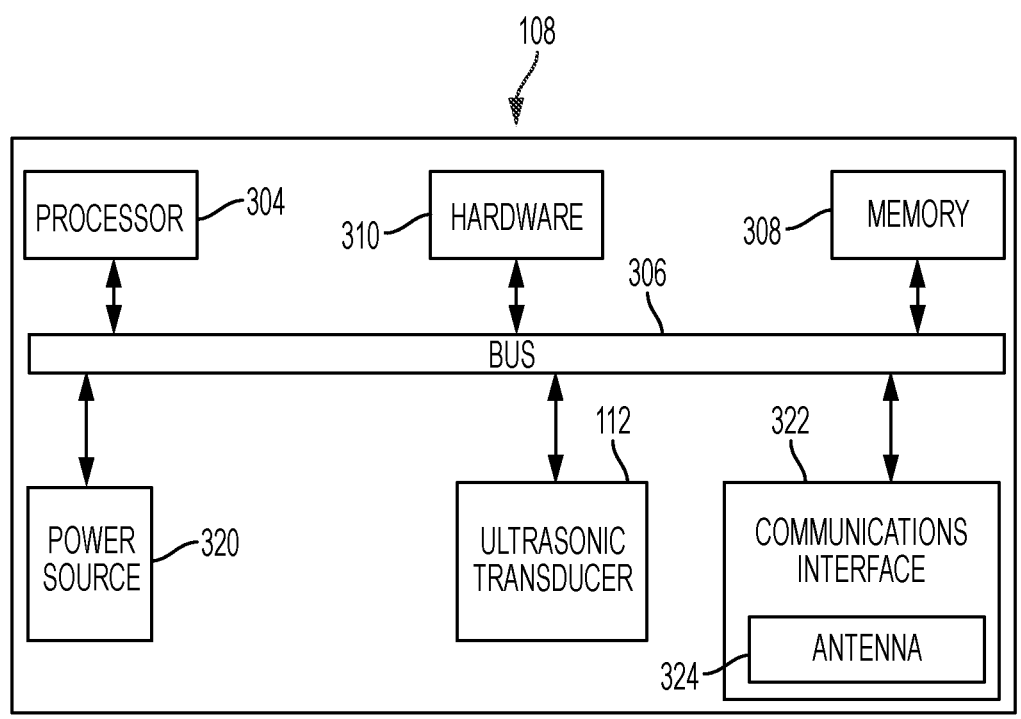
FIG. 3 is a block diagram of an example of an ultrasonic sensing system usable with a downhole ultrasonic transducer according to some aspects of the present disclosure.

FIG. 3 is a block diagram of an example of an ultrasonic sensing system 108 usable with the downhole ultrasonic transducer 112 according to some aspects. In some examples, the components shown in FIG. 3 (e.g., the power source 320, ultrasonic transducer 112, communications interface 322, processor 304, memory 308, and hardware 310) can be integrated into a single structure. For example, the components can be within a single housing. In other examples, the components shown in FIG. 3 can be distributed (e.g., in separate housings) and in electrical communication with each other.

The ultrasonic sensing system 108 can include a processor 304, a memory 308, and a bus 306. The processor 304 can execute one or more operations for operating the ultrasonic sensing system 108. The processor 304 can execute instructions stored in the memory 308 to perform the operations. The processor 304 can include one processing device or multiple processing devices. Non-limiting examples of the processor 304 include a Field-Programmable Gate Array ("FPGA"), an application-specific integrated circuit ("ASIC"), a microprocessor, etc.

The processor 304 can be communicatively coupled to the memory 308 via the bus 306. The non-volatile memory 308 may include any type of memory device that retains stored information when powered off. Non-limiting examples of the memory 308 include electrically erasable and programmable read-only memory ("EEPROM"), flash memory, or any other type of non-volatile memory. In some examples, at least some of the memory 308 can include a non-transitory medium from which the processor 304 can read instructions. A non-transitory computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which the processor 304 can read instructions. The instructions can include processor-specific instructions generated by a compiler or an interpreter from code written in any suitable computer-programming language, including, for example, C, C++, C#, etc.

The ultrasonic sensing system 108 can include a power source 320. In some examples, the power source 320 can include a battery or a thermal electric generator (e.g., for powering the ultrasonic sensing system 108). In other examples, the power source 320 can include an electrical cable (e.g., a wireline) electrically coupled to the ultrasonic sensing system 108.

The ultrasonic sensing system 108 can include a communications interface 322. The communications interface 322 can include a wired interface or a wireless interface (which can include an antenna 324). In some examples, part of the communications interface 322 can be implemented in software. For example, the communications interface 322 can include instructions stored in memory 308.

The ultrasonic sensing system 108 can use the communications interface to communicate with one or more external devices. In some examples, the communications interface 322 can amplify, filter, demodulate, demultiplex, frequency shift, and otherwise manipulate a signal received from an external device. The communications interface 322 can transmit a signal associated with the received signal to the processor 304 or the hardware 310. The processor 304 or hardware 310 can receive and analyze the signal to retrieve data associated with the received signal.

In some examples, the ultrasonic sensing system 108 can analyze the data from the communications interface 322 and perform one or more functions. For example, the ultrasonic sensing system 108 can generate a response based on the data. The ultrasonic sensing system 108 (e.g., the processor 304) can cause a response signal associated with the response to be transmitted to the communications interface 322. The communications interface 322 can generate a transmission signal (e.g., via the antenna 324) to communicate the response to a remote electronic device. For example, the communications interface 322 can amplify, filter, modulate, frequency shift, multiplex, and otherwise manipulate the response signal to generate the transmission signal. In some examples, the communications interface 322 can encode data within the response signal using a modulation technique (e.g., frequency modulation, amplitude modulation, or phase modulation) to generate the transmission signal. The communications interface 322 can transmit the transmission signal to the antenna 324. The antenna 324 can receive the transmission signal and responsively generate a wireless communication. In this manner, the ultrasonic sensing system 108 can receive, analyze, and respond to communications from an external electronic device.

In some examples, the ultrasonic transducer 112 can transmit ultrasonic signals and detect reflected ultrasonic waves. In some examples, the ultrasonic transducer 112 is, or includes, an ultrasonic sensor. In such an example, the ultrasonic transducer 112 may be able to generate ultrasonic waves and detect ultrasonic waves. For example, the ultrasonic sensing system 108 can use the ultrasonic transducer 112 to generate ultrasonic waves. The ultrasonic sensing system 108 can also use the ultrasonic transducer 112 to detect ultrasonic waves (e.g., ultrasonic waves propagating through the wellbore 102).

In other examples, the ultrasonic transducer 112 can transmit ultrasonic signals and a separate ultrasonic sensor can detect ultrasonic waves. For example, the ultrasonic sensor can detect reflections of ultrasonic waves propagating through a wellbore 102. Examples of the ultrasonic sensor can include a microphone or a hydrophone. A hydrophone can detect ultrasonic waves propagating through a liquid medium.

The ultrasonic transducer 112 (or the ultrasonic sensor, if included) can transmit data to the processor 304, the hardware 310, or both. The processor 304 or hardware 310 can perform one or more functions based on the data, communicate the data (via the communications interface 322) to an external electronic device, or both.

In some examples, the ultrasonic sensing system 108 can include multiple ultrasonic sensors. The ultrasonic sensors can be arranged in an array. The array of ultrasonic sensors can transmit data to the processor 304, the hardware 310, or both.

In some examples, the ultrasonic sensing system 108 can include more, fewer, or different components than those shown in FIG. 3. Additionally or alternatively, the components of the ultrasonic sensing system 108 can be configured differently than the configuration shown in FIG. 3. For example, the ultrasonic sensing system 108 may not include the processor 304, memory 308, or both. In such an example, the ultrasonic transducer 112 and communications interface 322 may be configured to directly communicate with one another or to communicate via bus 306. For example, the ultrasonic transducer 112 can be configured to directly communicate data to the communications interface 322 for wireless transmission. In some examples, the power source 320 can directly communicate with the ultrasonic transducer 112. For example, the power source 320 can directly transmit electrical signals to the ultrasonic transducer 112 to operate the ultrasonic transducer.

Figure 4:
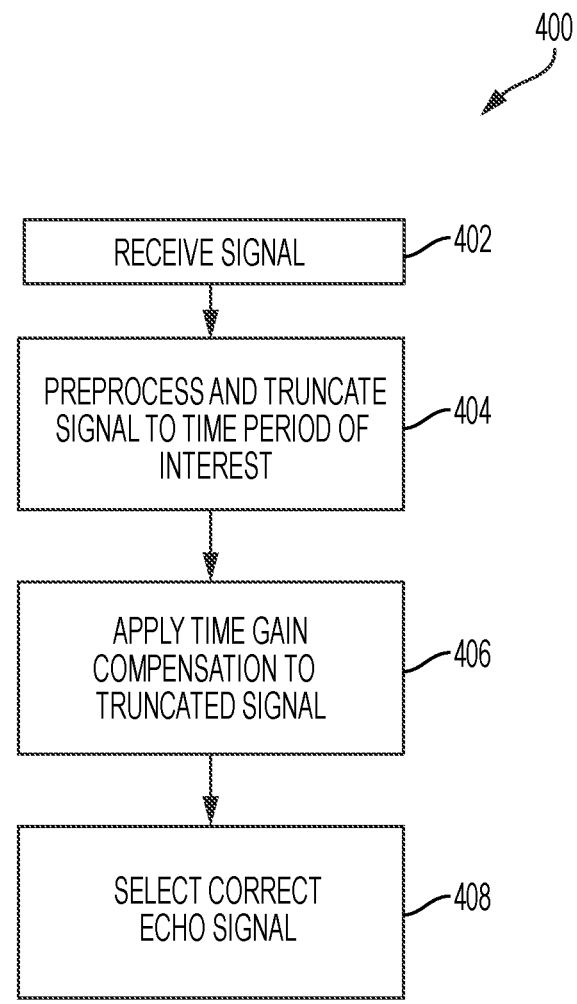
FIG. 4 is a flow chart of a process for analyzing a reflected ultrasonic signal according to some aspects of the present disclosure.

FIG. 4 is a flowchart of a process 400 for processing a reflected ultrasonic signal according to some aspects. Because of the high attenuation of the mud or other wellbore fluids on the ultrasonic signals, increasing the signal to noise ratio (SNR) of a reflected ultrasonic signal received at the ultrasonic sensing system 108 may be valuable to locate an echo of the ultrasonic signal from a correct element of the wellbore 102 (e.g., the wellbore wall, the cement sheath 105, the casing string 106, etc.). At block 402, the ultrasonic signal is received at the ultrasonic sensing system 108, and the ultrasonic sensing system 108 generates an electrical signal representative of the ultrasonic signal. Because of ringdown noise (e.g., self-noise associated with generating the ultrasonic signal by the ultrasonic transducer 112) and signal attenuation associated with the mud or other wellbore fluids, the SNR of the received signal may not be sufficient to locate the correct echo of the ultrasonic signal.

Thus, at block 404, the ultrasonic signal received by the ultrasonic sensing system 108 is preprocessed and truncated to a time period of interest. Truncating the ultrasonic signal to the time period of interest may involve removing portions of the ringdown noise from the ultrasonic signal. Because the ringdown noise is associated with generation of the ultrasonic signal of the ultrasonic transducer 112, an initial portion of the ultrasonic signal received by the ultrasonic sensing system 108 may include a significant amount of the ringdown noise. Accordingly, the ultrasonic signal received by the ultrasonic sensing system 108 may be truncated to remove the initial portion of the ultrasonic signal including the ringdown noise.

In one or more embodiments, truncation of the ultrasonic signal may remove all of the ringdown noise components on the ultrasonic signal received by the ultrasonic sensing system 108. Based on a standoff of the ultrasonic sensing system 108 from a wall of the wellbore 102 or other features of interest within the well, the time period of interest may be between approximately 20 and 90 microseconds. Accordingly, the first 20 microseconds of the ultrasonic signal received at the ultrasonic sensing system 108 may be removed to at least partially remove the effects of the ringdown noise on the received ultrasonic signal.

In one or more additional or alternative embodiments, the received ultrasonic signal may also be preprocessed. The ringdown noise of the received ultrasonic signal may be removed during preprocessing of the received ultrasonic signal by subtracting a predefined self-noise signature of the ultrasonic transducer 112. That is, the memory 308 of the ultrasonic sensing system 108 may store the predefined self-noise signature of the ultrasonic transducer 112, and the processor 304 of the ultrasonic sensing system 108 may subtract the predefined self-noise signature of the ultrasonic transducer 112 to remove the ringdown noise from the ultrasonic signal received by the ultrasonic sensing system 108.

At block 406, a time gain compensation is applied to the truncated signal. Because a composition of the mud is known at the surface 109 of the wellbore 102, the mud attenuation can be estimated. Based on an ultrasonic signal decay rate resulting from the mud attenuation, a gain may be used to amplify the truncated signal. Further, the gain value may increase with the flight time of the ultrasonic signal. For example, a gain window may be defined by the following equation:

$$g(t)=t^\alpha \quad \text{(Equation 1)}$$

where $\alpha$ is a constant. The gain window represents a gain value applied to the amplitude of the ultrasonic signal at a given time. For example, when a value of $\alpha$ is 1, the gain value applied to the ultrasonic signal increases at the same rate over time. In another embodiment, when the value of $\alpha$ is 2, the gain value applied to the ultrasonic signal increases at an exponential rate. Taking the value of $\alpha$ as 2, the gain window may compensate for the signal decay associated with the mud attenuation in the ultrasonic echo, but the gain window may also amplify trailing waves (i.e., subsequent echoes) to a similar amplitude. Accordingly, a smaller value of $\alpha$, such as 1, may be selected to avoid over amplification of the trailing waves. If, after amplifying the ultrasonic signal, a wavelet indicative of the echo is not apparent, the value of $\alpha$ may be increased to increase amplification on the ultrasonic signal and identify the echo wavelet.

At block 408, the correct echo signal is selected. Because multiple wavelets may be present in the ultrasonic signal received by the ultrasonic sensing system 108, the processor 304 of the ultrasonic sensing system 108 may select the correct wavelet in the ultrasonic signal as the echo of the ultrasonic signal off of a wall of the wellbore 102. By way of example, selecting the correct wavelet may include distinguishing the correct wavelet representative of the echo from other wavelets representative of echoes off of drilling cuttings suspended in the mud and/or wavelets representative of trailing echoes (e.g., echoes off of the wall of the wellbore 102 after the initial echo). Selection of the correct wavelet is discussed in greater detail below with respect to FIG. 8.

Figure 5:
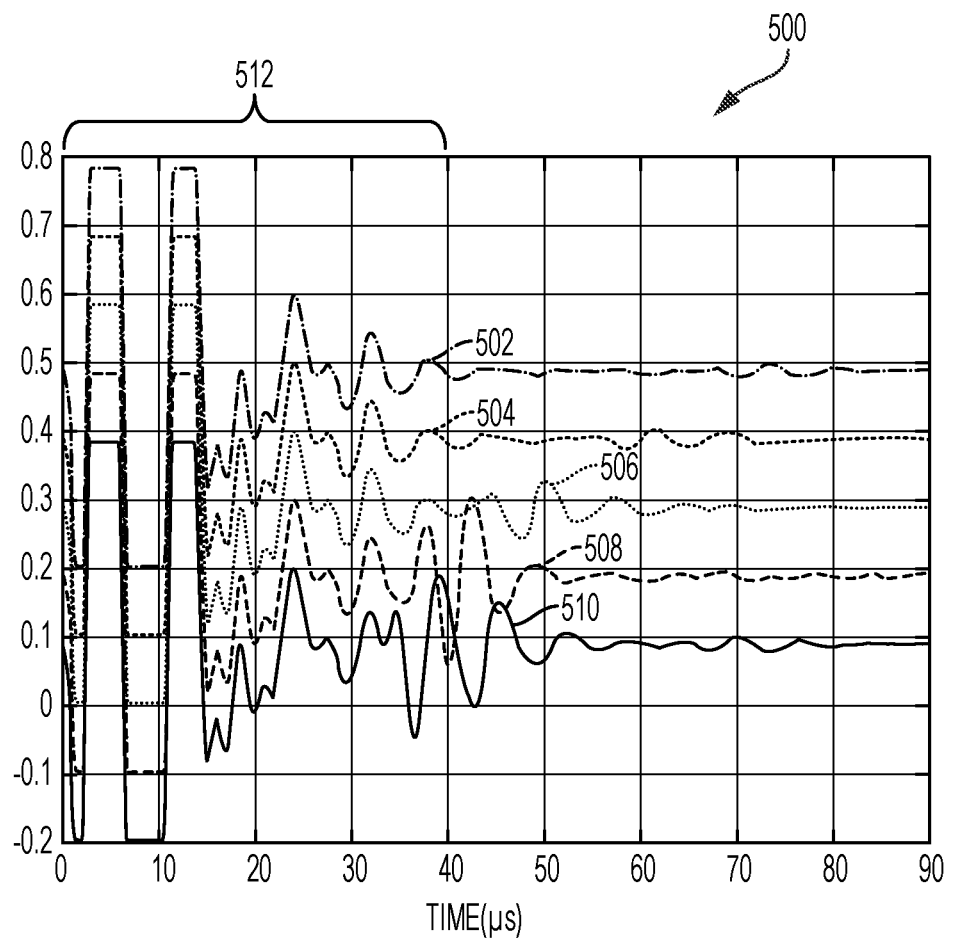
FIG. 5 is a graph depicting an example of amplitudes of ultrasonic waves output by an ultrasonic transducer and received by an ultrasonic sensing system according to some aspects of the present disclosure.

FIG. 5 is a graph 500 depicting an example of amplitudes of ultrasonic waves output by the ultrasonic transducer 112 and received by the ultrasonic sensing system 108 according to some aspects of the present disclosure. Line 502 represents the amplitude response of the ultrasonic transducer 112 with a 1.64 inch standoff from the wellbore 102. Line 504 represents the amplitude response of the ultrasonic transducer 112 with a 1.09 inch standoff from the wellbore 102. Line 506 represents the amplitude response of the ultrasonic transducer 112 with a 1.04 inch standoff from the wellbore 102. Line 508 represents the amplitude response of the ultrasonic transducer 112 with a 0.86 inch standoff from the wellbore 102. Line 510 represents the amplitude response of the ultrasonic transducer 112 with a 0.81 inch standoff from the wellbore 102. The term standoff is representative of a distance between the ultrasonic transducer 112 and a wall of the wellbore 102, or other wellbore characteristic that is measured by the ultrasonic sensing system 108.

As illustrated, a period of time from approximately 0 seconds to 40 microseconds may include a significant amount of ringdown noise. The ringdown noise may be self-noise associated with generating the ultrasonic signal by the ultrasonic transducer 112. Such noise is received at the ultrasonic sensing system 108 in addition to the echoed ultrasonic signal, and the ringdown noise may interfere with the ability of the ultrasonic sensing system 108 to detect the echo of the ultrasonic signal off of the wall of the wellbore 102.

Figure 6:
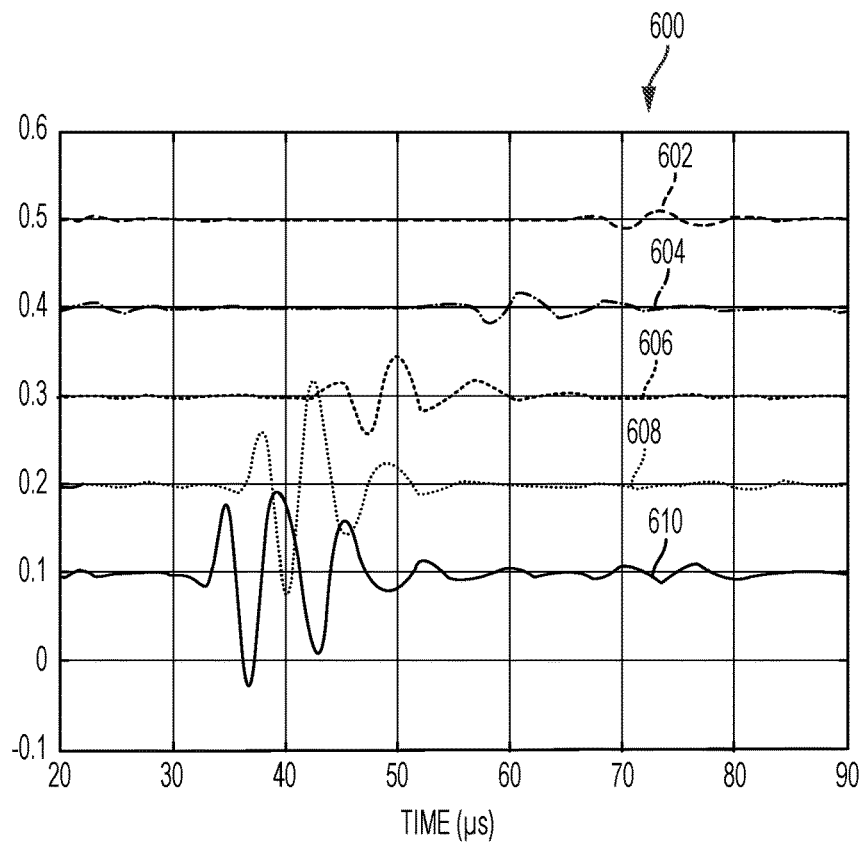
FIG. 6 is a graph depicting an example of preprocessed and truncated amplitudes of ultrasonic waves output by the ultrasonic transducer and received by the ultrasonic sensing system according to some aspects of the present disclosure.

To address the ringdown noise, the ultrasonic signal received at the ultrasonic sensing system 108 may be preprocessed and truncated. As an example, FIG. 6 is a graph 600 depicting an example of preprocessed and truncated amplitudes of ultrasonic waves output by the ultrasonic transducer 112 and received by the ultrasonic sensing system 108 according to some aspects of the present disclosure. Line 602 represents the preprocessed and truncated amplitude response of the ultrasonic transducer 112 with a 1.64 inch standoff from the wellbore 102. Line 604 represents the preprocessed and truncated amplitude response of the ultrasonic transducer 112 with a 1.09 inch standoff from the wellbore 102. Line 606 represents the preprocessed and truncated amplitude response of the ultrasonic transducer 112 with a 1.04 inch standoff from the wellbore 102. Line 608 represents the preprocessed and truncated amplitude response of the ultrasonic transducer 112 with a 0.86 inch standoff from the wellbore 102. Line 610 represents the preprocessed and truncated amplitude response of the ultrasonic transducer 112 with a 0.81 inch standoff from the wellbore 102.

As illustrated in FIG. 6, the first 20 microseconds of the amplitude responses are removed by truncation of the amplitude responses. Further, any remaining ringdown noise may be removed by preprocessing the truncated amplitude responses. As discussed above with respect to FIG. 4, preprocessing the amplitude responses to remove any remaining ringdown noise may involve subtracting a predefined self-noise signature of the ultrasonic transducer 112 from the amplitude responses. That is, the memory 308 of the ultrasonic sensing system 108 may store the predefined self-noise signature of the ultrasonic transducer 112, and the processor 304 of the ultrasonic sensing system 108 may subtract the predefined self-noise signature of the ultrasonic transducer 112 to remove the ringdown noise from the ultrasonic signal received by the ultrasonic sensing system 108.

Figure 7:
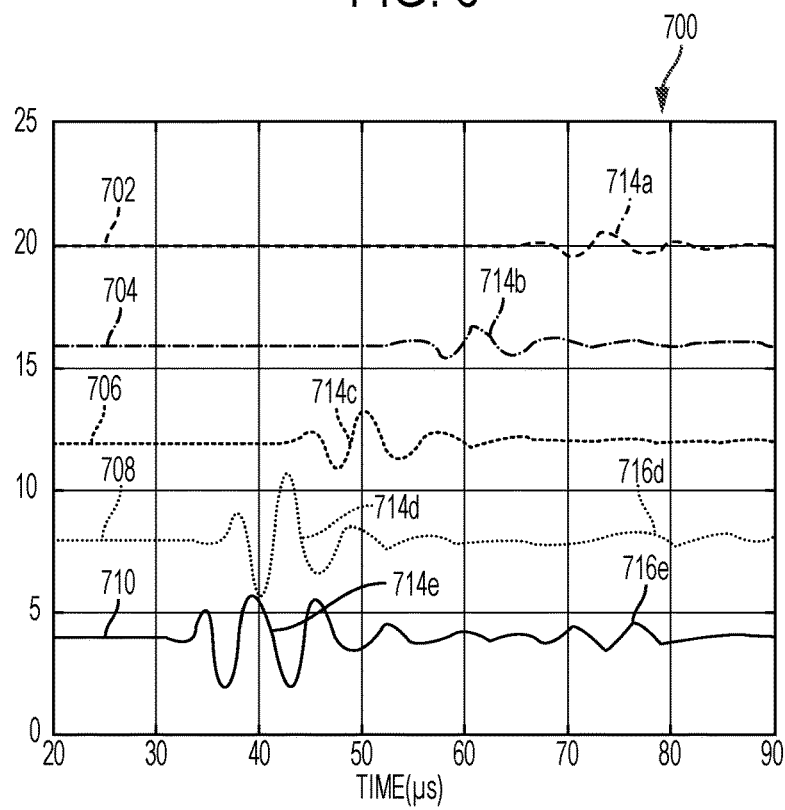
FIG. 7 is a graph depicting an example of time gain compensated amplitudes of ultrasonic waves output by the ultrasonic transducer and received by the ultrasonic sensing system according to some aspects of the present disclosure.

FIG. 7 is a graph 700 depicting an example of time gain compensated amplitudes of ultrasonic waves output by the ultrasonic transducer 112 and received by the ultrasonic sensing system 108 according to some aspects of the present disclosure. Line 702 represents the time gain compensated amplitude response of the ultrasonic transducer 112 with a 1.64 inch standoff from the wellbore 102 after truncation and preprocessing. Line 704 represents the time gain compensated amplitude response of the ultrasonic transducer 112 with a 1.09 inch standoff from the wellbore 102 after truncation and preprocessing. Line 706 represents the time gain compensated amplitude response of the ultrasonic transducer 112 with a 1.04 inch standoff from the wellbore 102 after truncation and preprocessing. Line 708 represents the time gain compensated amplitude response of the ultrasonic transducer 112 with a 0.86 inch standoff from the wellbore 102 after truncation and preprocessing. Line 710 represents the time gain compensated amplitude response of the ultrasonic transducer 112 with a 0.81 inch standoff from the wellbore 102 after truncation and preprocessing.

Because a composition of the mud within the wellbore 102 is known at the surface 109 of the wellbore 102, the mud attenuation can be estimated. Based on an ultrasonic signal decay rate resulting from the mud attenuation, a gain may be used to amplify the truncated signal, as discussed above with respect to FIG. 4. In one or more examples, a value of the gain may increase as the time of flight of the ultrasonic signal also increases. For example, the gain applied to the amplitude response at 20 microseconds may be smaller than the gain applied to the amplitude response at 80 microseconds. This increasing gain assists the ultrasonic sensing system 108 in isolating early or trailing echoes from the initial echo off of the wall or other characteristic of the wellbore 102 that is used in ultrasonic imaging or ultrasonic caliper measurements. The resulting signal provides time gain compensated indications of wavelets 714a-e that may be representative of the initial echo of the ultrasonic signal from the wall or other characteristic of the wellbore 102. Other wavelets 716d and 716e with much smaller amplitudes even after the time gain compensation may also be present. The wavelets 716d and 716e may represent trailing reflections (e.g., a second ultrasonic wave reflection off of the wall of the wellbore 102), or the wavelets 716d and 716e may represent reflections from cuttings that are suspended in the mud within the wellbore 102.

Figure 8:
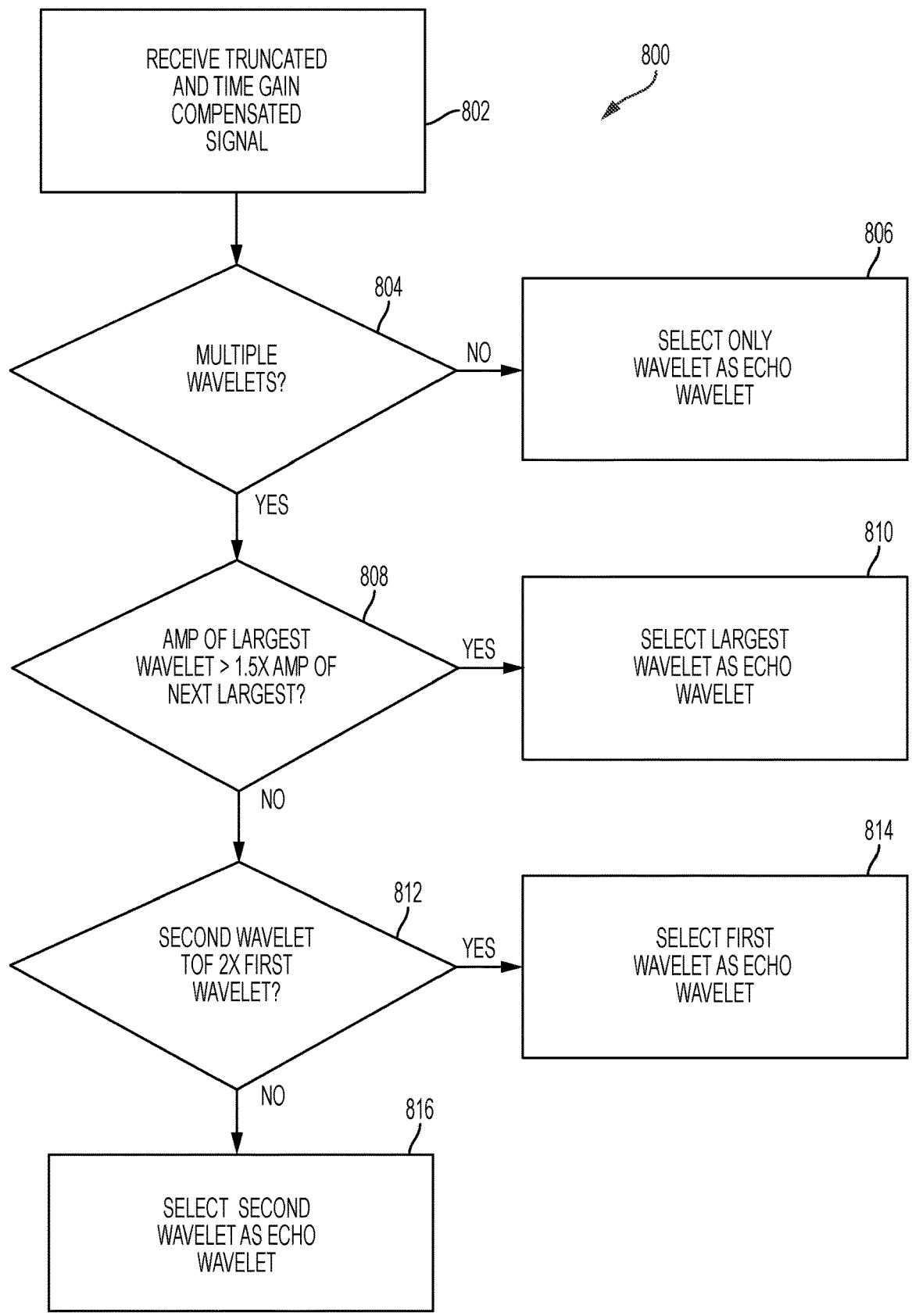
FIG. 8 is a flowchart of a process for selecting a wavelet indicative of an echo off of a wall or other characteristic of a wellbore according to some aspects of the present disclosure.

To address an amplitude response that includes multiple wavelets, FIG. 8 is a flowchart of a process 800 for selecting a correct wavelet indicative of an initial echo off of the wall or other characteristic of the wellbore 102 according to some aspects. At block 802 the truncated, preprocessed, and time gain compensated signal is received by the processor 304 of the ultrasonic sensing system 108. In an embodiment, this signal may be represented by one of the lines 702-710 depicted in FIG. 7.

At block 804, a determination is made by the processor 304 as to whether the signal includes multiple wavelets. If the signal includes only a single wavelet, the single wavelet is selected, at block 806, as the wavelet representing the initial echo off of the wall or other characteristic of the wellbore 102.

If multiple wavelets are present on the signal, a determination is made at block 808 as to whether an amplitude of a largest wavelet is greater than 1.5 times larger than an amplitude of the next largest wavelet. If the amplitude of the largest wavelet is greater than 1.5 times larger than the amplitude of the next largest wavelet, the largest wavelet is selected, at block 810, as the wavelet representing the initial echo off of the wall or other characteristic of the wellbore 102. This may indicate that the smaller wavelets are reflections off of cuttings suspended within the mud or subsequent echoes off of the wall of the wellbore 102.

If the largest wavelet is not greater than 1.5 times larger than the amplitude of the next largest wavelet, at block 812 a determination is made as to whether a time of flight of a second wavelet is twice as long as a time of flight of the first wavelet. A time of flight may be defined as an amount of time between the ultrasonic transducer 112 generating the ultrasonic signal and when the ultrasonic sensing system 108 records the wavelet at issue. If the time of flight of the second wavelet is twice as long as the time of flight of the first wavelet, then the second wavelet is likely a trailing echo off of the wall or other characteristic of the wellbore 102 being measured by the ultrasonic sensing system 108. Accordingly, the first wavelet is selected, at block 814, as the correct echo.

If the time of flight of the second wavelet is not twice as long as the time of flight of the first wavelet, then the first wavelet is likely a reflection of the ultrasonic signal off of cuttings suspended within the mud. In such an instance, the second wavelet is selected at block 816 as the correct echo. Further, the ultrasonic sensing system 108, when relying on the correct echo for imaging purposes, may make note that the reflection off of the cuttings (i.e., the first wavelet) is likely to reduce an amplitude of the correct echo (i.e., the second wavelet).

Figure 9:
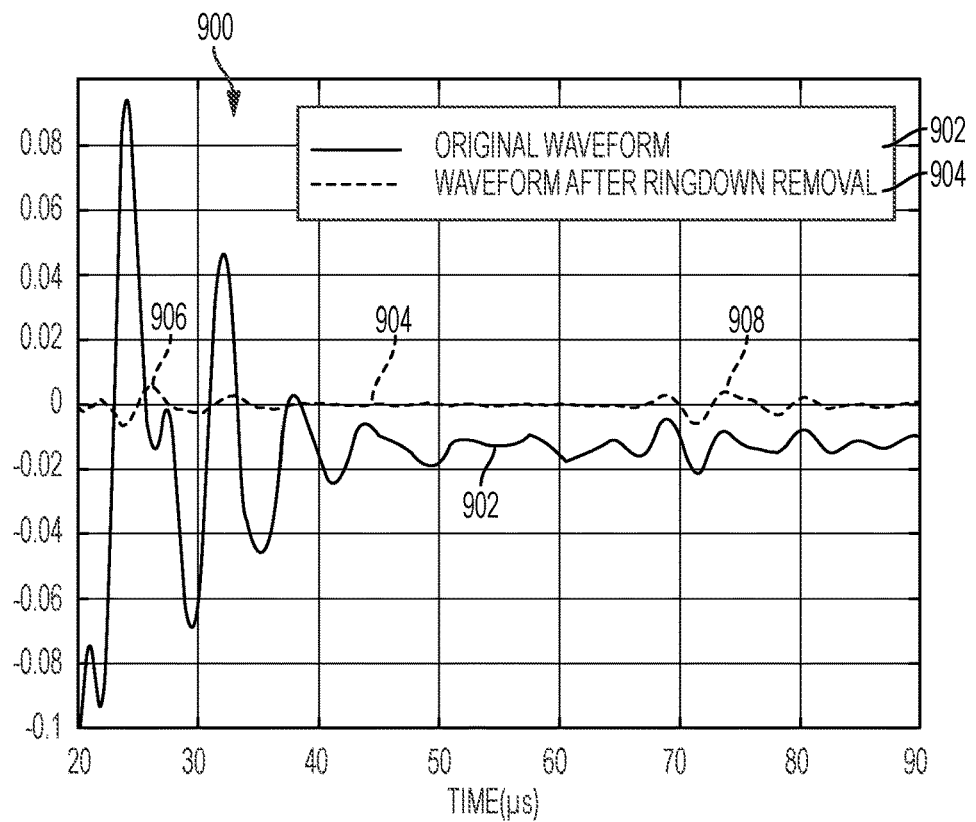
FIG. 9 is a graph depicting an example of amplitudes of ultrasonic waves received by an ultrasonic sensing system and processed by a processor according to some aspects of the present disclosure.
Figure 10:
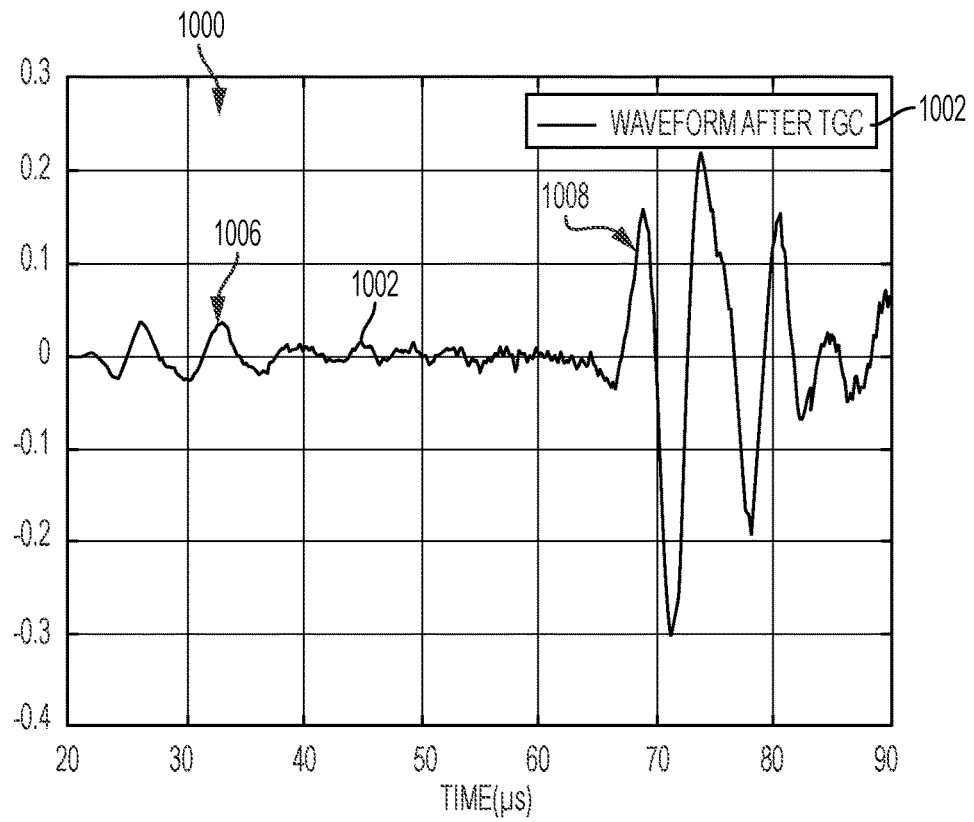
FIG. 10 is a graph depicting an example of amplitudes of ultrasonic waves received by an ultrasonic sensing system and processed by a processor according to some aspects of the present disclosure.

To help illustrate selection of the correct echo, FIGS. 9 and 10 are graphs depicting an example of amplitudes of ultrasonic waves received by the ultrasonic sensing system 108 and processed by the processor 304 according to some aspects. FIG. 9 is a graph 900 that includes lines 902 and 904. The line 902 depicts an amplitude representation of the original waveform output by the ultrasonic transducer 112 and received by the ultrasonic sensing system 108. The line 904 depicts an amplitude representation of the ultrasonic signal received by the ultrasonic sensing system 108 after the ultrasonic signal undergoes ringdown noise removal. As shown, the line 904 includes a first wavelet 906 and a second wavelet 908 with approximately equal amplitude values.

Turning to FIG. 10, a graph 1000 includes line 1002. The line 1002 depicts the line 904 of FIG. 9 after undergoing time gain compensation. After undergoing time gain compensation, an amplitude of a first wavelet 1006 is substantially smaller than an amplitude of the second wavelet 1008. Accordingly, the processor 304 is able to determine the wavelet 1006 or 1008 that is indicative of the correct echo (i.e., the initial echo off of the wall or other characteristic of the wellbore 102). The amplitude of the second wavelet 1008 is more than 1.5 times larger than the amplitude of the first wavelet 1006. According to block 808 of the process 800, the wavelet 1008 is the initial echo off of the wall or other characteristic of the wellbore 102 based on the amplitude of the second wavelet 1008 in relation to the amplitude of the first wavelet 1006. This also indicates that the first wavelet 1006 is likely a reflection off of drill cuttings that are suspended in the mud within the wellbore 102.

In some aspects, systems, devices, and methods for locating an ultrasonic echo using time gain compensation are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a sensor system for use in a wellbore, the sensor system comprising: an ultrasonic transducer to generate an ultrasonic wave in a medium of the wellbore and to detect a reflection signal of the ultrasonic wave off an object in the wellbore; a processing device; and a memory device in which instructions are stored that are executable by the processing device for causing the processing device to: receive the reflection signal from the ultrasonic transducer; truncate and preprocess the reflection signal to a time period of interest to generate a truncated reflection signal; apply time gain compensation to the truncated reflection signal to generate a time gain compensated signal; and determine an echo wavelet from the time gain compensated signal, the echo wavelet representing an echo of the ultrasonic wave off of a wall of the wellbore.

Example 2 is the sensor system of example 1, wherein instructions are further executable by the processing device to: determine a characteristic of the wellbore based on the echo wavelet.

Example 3 is the sensor system of example 2, wherein the characteristic of the wellbore is an imaging of the wellbore, a measured diameter of part of the wellbore, an impedance of borehole material, an existence of a deformity of a wall of the wellbore, or any combination thereof.

Example 4 is the sensor system of example(s) 1-3, wherein the ultrasonic transducer is an ultrasound ultrasonic transducer for outputting the ultrasonic wave at a frequency of 20 kHz or higher.

Example 5 is the sensor system of example(s) 1-4, wherein the ultrasonic transducer is positioned on a logging-while-drilling tool or a wireline tool.

Example 6 is the sensor system of example(s) 1-5, wherein instructions are executable for causing the processing device to determine the echo wavelet from the time gain compensated signal by: determining the time gain compensated signal comprises multiple wavelets or a single wavelet; in response to determining the time gain compensated signal is the single wavelet, identifying the single wavelet as the echo wavelet; and in response to determining the time gain compensated signal is multiple wavelengths: determining a first amplitude of a largest wavelet of the multiple wavelets is greater or less than 1.5 times a second amplitude of a next largest wavelet of the multiple wavelets; in response to determining the first amplitude is greater than 1.5 times the second amplitude, identifying the largest wavelet as the echo wavelet; and in response to determining the first amplitude is not greater than 1.5 times the second amplitude: identifying a second wavelet of the multiple wavelets comprises a second time of flight that is two times a first time of flight of a first wavelet of the multiple wavelets or is not two times the first time of flight of the first wavelet of the multiple wavelets; in response to determining that the second time of flight is two times the second time of flight, selecting the first wavelet as the echo wavelet; and in response to determining that the second time of flight is not two times the first time of flight, selecting the second wavelet as the echo wavelet.

Example 7 is the sensor system of example(s) 1-6, wherein instructions are executable for causing the processing device to determine the echo wavelet from the time gain compensated signal by distinguishing the echo wavelet from wavelets generated by other sources.

Example 8 is the sensor system of example(s) 1-7, wherein applying the time gain compensation comprises applying a gain window of $g(t)=t^{\propto}$ to the truncated reflection signal, wherein $\propto$ is adjustable based on an attenuation of the medium in the wellbore on the ultrasonic wave.

Example 9 is a method, comprising; disposing a well tool in a wellbore, the well tool including a hydrophone and an ultrasonic transducer; outputting, by the ultrasonic transducer, an ultrasonic wave in a medium of the wellbore; detecting, by the hydrophone, a reflection of the ultrasonic wave off an object in the wellbore; generating, by the hydrophone, a representative signal of the reflection of the ultrasonic wave off the object in the wellbore; truncating and preprocessing the representative signal to remove ringdown noise from the representative signal and to generate a truncated representative signal; applying a time gain compensation to the truncated representative signal to generate a time gain compensated signal; and identifying an ultrasonic echo that represents a characteristic of the object using the time gain compensated signal.

Example 10 is the method of example 9, wherein the object is a wall of the wellbore.

Example 11 is the method of example(s) 9-10, wherein the characteristic of the object is a sound velocity characteristic of the object, a porosity of the object, a fracture characteristic of the object, a material composition of the object, a texture of the object, or any combination of thereof.

Example 12 is the method of example(s) 9-11, wherein identifying the ultrasonic echo comprises distinguishing an initial echo wavelet from wavelets generated by other sources.

Example 13 is the method of example(s) 9-12, wherein the ringdown noise is removed from the representative signal by subtracting a predefined self-noise signature of the ultrasonic transducer from the representative signal.

Example 14 is the method of example(s) 9-13, wherein the ultrasonic transducer is an ultrasound ultrasonic transducer for outputting the ultrasonic wave at a frequency of 20 kHz or higher.

Example 15 is the method of example(s) 9-14, wherein the well tool is in a logging-while-drilling tool or a wireline tool.

Example 16 is a non-transitory computer-readable medium that includes instructions that are executable by a processing device to perform operations comprising: detecting, in a medium of a wellbore, a reflection of an ultrasonic wave off an object in a wellbore; generating a representative signal of the reflection of the ultrasonic wave off the object in the wellbore; truncating and preprocessing the representative signal to remove ringdown noise from the representative signal and generate a truncated representative signal; applying a time gain compensation to the truncated representative signal to generate a time gain compensated signal; and identifying an ultrasonic echo representative of a characteristic of the object based on the time gain compensated signal.

Example 17 is the non-transitory computer-readable medium of example 16, wherein the characteristic is an imaging of the object.

Example 18 is the non-transitory computer-readable medium of example(s) 16-17, wherein the characteristic is a measured diameter of part of the wellbore, an impedance of borehole material, an existence of a deformity of a wall of the wellbore, or any combination thereof.

Example 19 is the non-transitory computer-readable medium of example(s) 16-18, wherein identifying the ultrasonic echo comprises distinguishing an echo wavelet originating at the object in the wellbore from wavelets generated by other sources.

Example 20 is the non-transitory computer-readable medium of example(s) 16-19, wherein the time gain compensation is adjustable based on an attenuation of the medium in the wellbore on the ultrasonic wave.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A sensor system for use in a wellbore, the sensor system comprising:
    an ultrasonic transducer to generate an ultrasonic wave in a medium of the wellbore and to detect a reflection signal of the ultrasonic wave off an object in the wellbore;
    a processing device; and
    a memory device in which instructions are stored that are executable by the processing device for causing the processing device to:
        receive the reflection signal from the ultrasonic transducer;
        truncate and preprocess the reflection signal to a time period of interest to generate a truncated reflection signal;
        apply time gain compensation to the truncated reflection signal to generate a time gain compensated signal;
        determine that the time gain compensated signal comprises multiple wavelets; and
        determine an echo wavelet from the time gain compensated signal by determining that the echo wavelet has an amplitude that is at least 1.5 times greater than a next-largest wavelet of the multiple wavelets, by determining that the echo wavelet has a time of flight that is at least two times shorter than a second time of flight corresponding to a second wavelet of the multiple wavelets, or by a combination thereof, the echo wavelet representing an echo of the ultrasonic wave off of a wall of the wellbore.

2. The sensor system of claim 1, wherein the instructions are further executable by the processing device to determine a characteristic of the wellbore based on the echo wavelet.

3. The sensor system of claim 2, wherein the characteristic of the wellbore is an imaging of the wellbore, a measured diameter of part of the wellbore, an impedance of borehole material, an existence of a deformity of a wall of the wellbore, or any combination thereof.

4. The sensor system of claim 1, wherein the ultrasonic transducer is an ultrasound ultrasonic transducer for outputting the ultrasonic wave at a frequency of 20 kHz or higher.

5. The sensor system of claim 1, wherein the ultrasonic transducer is positioned on a logging-while-drilling tool or a wireline tool.

6. The sensor system of claim 1, wherein the instructions are executable for causing the processing device to determine the echo wavelet from the time gain compensated signal by:
    determining a first amplitude of a largest wavelet of the multiple wavelets is greater or less than 1.5 times a second amplitude of the next largest wavelet of the multiple wavelets;
    in response to determining the first amplitude is greater than 1.5 times the second amplitude, identifying the largest wavelet as the echo wavelet; and
    in response to determining the first amplitude is not greater than 1.5 times the second amplitude:
        identifying the second wavelet of the multiple wavelets comprises a second time of flight that is two times a first time of flight of a first wavelet of the multiple wavelets or is not two times the first time of flight of the first wavelet of the multiple wavelets;
        in response to determining that the second time of flight is two times the second time of flight, selecting the first wavelet as the echo wavelet; and
        in response to determining that the second time of flight is not two times the first time of flight, selecting the second wavelet as the echo wavelet.

7. The sensor system of claim 1, wherein instructions are executable for causing the processing device to determine the echo wavelet from the time gain compensated signal by distinguishing the echo wavelet from wavelets generated by other sources.

8. The sensor system of claim 1, wherein applying the time gain compensation comprises applying a gain window of $g(t)=t^{\alpha}$ to the truncated reflection signal, wherein a is adjustable based on an attenuation of the medium in the wellbore on the ultrasonic wave.

9. A method, comprising:
    disposing a well tool in a wellbore, the well tool including a hydrophone and an ultrasonic transducer;
    outputting, by the ultrasonic transducer, an ultrasonic wave in a medium of the wellbore;
    detecting, by the hydrophone, a reflection of the ultrasonic wave off an object in the wellbore;
    generating, by the hydrophone, a representative signal of the reflection of the ultrasonic wave off the object in the wellbore;
    truncating and preprocessing the representative signal to remove ringdown noise from the representative signal and to generate a truncated representative signal;
    applying a time gain compensation to the truncated representative signal to generate a time gain compensated signal;
    determining that the time gain compensated signal comprises multiple wavelets; and identifying an ultrasonic echo wavelet from the time gain compensated signal by determining that the ultrasonic echo wavelet has an amplitude that is at least 1.5 times greater than a next-largest wavelet of the multiple wavelets, by determining that the ultrasonic echo wavelet has a time of flight that is at least two times shorter than a second time of flight corresponding to a second wavelet of the multiple wavelets, or by a combination thereof, the ultrasonic echo wavelet representing a characteristic of the object.

10. The method of claim 9, wherein the object is a wall of the wellbore.

11. The method of claim 9, wherein the characteristic of the object is a sound velocity characteristic of the object, a porosity of the object, a fracture characteristic of the object, a material composition of the object, a texture of the object, or any combination of thereof.

12. The method of claim 9, wherein identifying the ultrasonic echo wavelet comprises distinguishing an initial echo wavelet from wavelets generated by other sources.

13. The method of claim 9, wherein the ringdown noise is removed from the representative signal by subtracting a predefined self-noise signature of the ultrasonic transducer from the representative signal.

14. The method of claim 9, wherein the ultrasonic transducer is an ultrasound ultrasonic transducer for outputting the ultrasonic wave at a frequency of 20 kHz or higher.

15. The method of claim 9, wherein the well tool is in a logging-while-drilling tool or a wireline tool.

16. A non-transitory computer-readable medium that includes instructions that are executable by a processing device to perform operations comprising:
    detecting, in a medium of a wellbore, a reflection of an ultrasonic wave off an object in the wellbore;
    generating a representative signal of the reflection of the ultrasonic wave off the object in the wellbore;
    truncating and preprocessing the representative signal to remove ringdown noise from the representative signal and generate a truncated representative signal;
    applying a time gain compensation to the truncated representative signal to generate a time gain compensated signal;
    determining that the time gain compensated signal comprises multiple wavelets; and
    identifying an ultrasonic echo wavelet from the time gain compensated signal by determining that the ultrasonic echo wavelet has an amplitude that is at least 1.5 times greater than a next-largest wavelet of the multiple wavelets, by determining that the ultrasonic echo wavelet has a time of flight that is at least two times shorter than a second time of flight corresponding to a second wavelet of the multiple wavelets, or by a combination thereof, the ultrasonic echo wavelet representing a characteristic of the object.

17. The non-transitory computer-readable medium of claim 16, wherein the characteristic is an imaging of the object.

18. The non-transitory computer-readable medium of claim 16, wherein the characteristic is a measured diameter of part of the wellbore, an impedance of borehole material, an existence of a deformity of a wall of the wellbore, or any combination thereof.

19. The non-transitory computer-readable medium of claim 16, wherein identifying the ultrasonic echo wavelet comprises distinguishing an echo wavelet originating at the object in the wellbore from wavelets generated by other sources.

20. The non-transitory computer-readable medium of claim 16, wherein the time gain compensation is adjustable based on an attenuation of the medium in the wellbore on the ultrasonic wave.

* * * * *